May 24, 1955     E. TIGER     2,708,779
COVER CLIP
Filed July 12, 1954
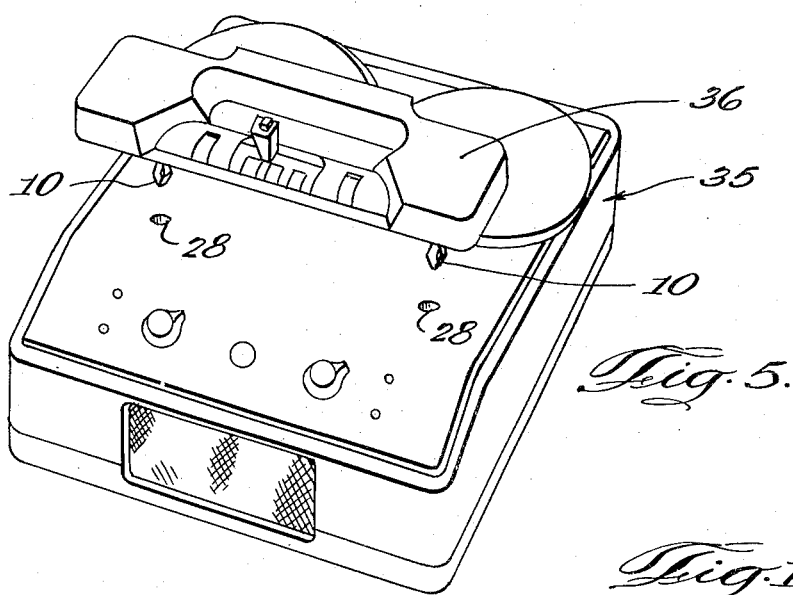
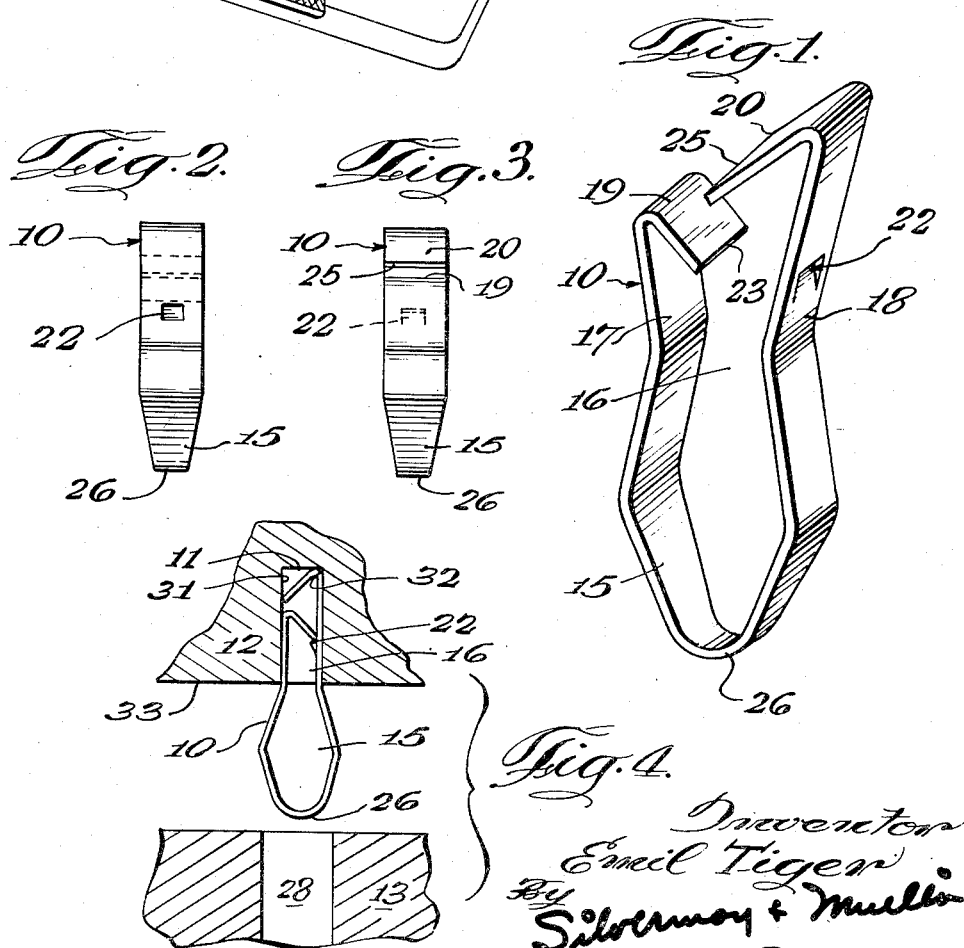

United States Patent Office 2,708,779
Patented May 24, 1955

2,708,779

COVER CLIP

Emil Tiger, Skokie, Ill., assignor to Sound, Inc., Chicago, Ill., a corporation of Illinois Application July 12, 1954, Serial No. 442,871

8 Claims. (Cl. 24—213)

This invention relates generally to fastening devices and more particularly is concerned with an article known as a cover clip, for use with removable covering members.

In many fields, and especially in the field of radio and television receivers, phonographs and other recording devices, there is required in practically every one of such devices a cover member in the form of an escutcheon plate, a name plate, a protective shroud, an indicia bearing housing, a tuning opening protector, or other enclosure which is firmly and accurately seated, but is readily removable from the chassis or casing for the device. Many various spring-fingered fasteners have been utilized, but where accuracy of placement and reliability of securement are required, these fasteners are secured to the removable member by expensive means such as rivets, screws and the like. In many instances even these fasteners are not satisfactory.

This invention contemplates providing a clip which has a protruding spring loop adapted to engage a suitable opening in the chassis or cover member, and to firmly but removably snap into said opening, the opposite end of the clip being formed with means intended to bite into the side wall of a hole or socket formed in the cooperative member for permanent securement therein. This, then is the primary object of the invention.

The clip of this invention has two ends, one of which is adapted for permanent securement, and the other end of which is adapted for resilient and removable securement. The clip is so constructed, and it is an object of the invention to provide such construction, that when the end for permanent securement is forced into a properly sized opening or socket, the structure will automatically wedge the clip into position. According to the invention, any attempts to remove the clip merely result in its being wedged tighter.

An important object of the invention lies in the provision of means to prevent lateral distortion of the clip. Thus, in prior clips which have been adapted for insertion into an opening by simple rectilinear movement, the resulting installation has been subject to lateral distortion because of the difficulty of securing both fingers of the clip. One clip is usually capable of being anchored, but until the advent of the invention herein, there was no known means of preventing sideward movement of the other finger or of preventing yielding of the second finger in some manner.

Still a further object of the invention is to provide structure preventing yielding of either of the fingers of the clip in any manner other than to further wedge the clip in proper position whereby the stress applied to the clip either in removal or installation of the cover member upon the chassis or housing is along an axis perpendicular to the cover member surface.

Another object of the invention lies in the provision of a novel finger structure for the clip in which both ends of the fingers of the clips are bent at an angle and directed in an outward direction relative to the socket in which the same is installed, one finger being longer than the other and having its bent end formed as a blade engaging a wall of the socket, the second finger having a similarly formed blade, but said blade engaging the first finger on the inside thereof, and a stop member or lug struck out of the wall of the first finger inwardly and engaged by the free end of the blade of the second member to prevent withdrawal of the clip from the socket.

Many additional objects will become apparent as a description of the invention proceeds in connection with which there is illustrated and described in considerable detail a preferred embodiment of the clip of the invention, but only by way of illustration and example and not by way of limitation. It will be seen that notwithstanding the simplicity of the clip, and its ease of operation and construction, a considerable number of advantages in use in many fields will certainly occur to those skilled in the art, and the invention is obviously intended to cover all such uses, since much variation in size and unimportant detail is possible without in any way departing from the spirit or scope of the invention.

In the drawing:

Fig. 1 is a perspective view of a spring cover clip constructed in accordance with the invention.

Fig. 2 is a side elevational view of the same looking from the right hand side of Fig. 1.

Fig. 3 is a side elevational view of the same looking from the left hand side of Fig. 2.

Fig. 4 is an exploded view showing the clip engaged in a socket of a cover member or the like and poised for insertion into a cooperative opening provided therefor in a chassis or the like.

Fig. 5 is a perspective view showing the type of device with which the invention may be associated, there being here illustrated a tape recorder the cover member of which is secured thereto by means of clips of the invention.

Prior to entering upon a discussion of the details of the invention it is desired to point out that the cover clip of the invention is in the form of an integral member of flat strip metal such as spring steel or Phosphor bronze, originally formed in an expanded or opened condition, so that in order for the same to be installed in the cover member (or in the chassis) it is required that same be pinched together thereby placing the same under spring tension, thus, when the fingers are inserted in the permanent socket for receiving the same the tendency will be for the same to expand into the side walls of the socket to pre-load the loop of the device and also, hold the fingers in place. Obviously the size of the clip is insufficient in and of itself to enable this tension alone to prevent withdrawal, and hence means are provided so that portions of the fingers themselves are forced to assume a dimension less than the normal size of the said parts which are pressed home into the socket. This force, properly used, may act to prevent withdrawal.

The clip is a U-shaped article, the loop or bight portion of the article or device intended to protrude from the socket in the cover member, although it is perfectly feasible for the clip to be permanently secured in a socket in the chassis or housing upon which the cover member is mounted, leaving the recess for receiving the loop portion in the cover member. The loop portion is removably engaged in the recess or opening provided for it. The arms of the U are free fingers inserted into the socket and held therein. It has been known to provide the reverse bent end on a long finger to anchor that, but when this is done, the other finger which is shorter has no support, and hence there is lateral movement of the entire clip, or at least of the shorter finger. In this invention, both of the fingers are firmly anchored, and attempts to withdraw the clip or exert lateral pressure against the loop merely wedges the clip tighter in position.

The reference character 10 designates generally a clip constructed in accordance with the invention adapted to be inserted in a recess 11 provided in a cover member 12, for securement of the cover member to a chassis or body 13. The cover member 12 and chassis or body 13 may be interchanged, so that the clip 10 is secured in the chassis. In Fig. 1 the clip 10 is shown in its condition prior to installation. Same is a U-shaped member having a generally rhombic shaped spring loop 15 providing a neck 16, the arms of the member providing the fingers 17 and 18. The fingers normally diverge from the neck 16 and each has a reverse bent end providing thereby inwardly extending blades 19 and 20. Between the neck and the reverse bent flange or blade 20 there is provided an inwardly struck lug or stop member 22 on the inner wall of the finger 18, positioned slightly below the position of the free edge 23 of the blade or flange 19 projected across to the finger 18.

It will be seen that the finger 17 is substantially shorter than the finger 18 by such an amount that when the clip is pinched together, the free edge 25 of the blade or flange 20 will clear the bend of the reverse bent flange or blade 19 and be able to engage the wall of the recess 11 beyond the said bend.

The tip or bight 26 of the loop 15 is narrowed by decreasing the width of the metal strip thereat to assist in its insertion into a suitable recess 28 formed in the chassis 13.

In manufacturing the member 10, the clip is formed to the configuration generally shown in Fig. 1 and then is hardened by heat treatment or the like to temper the same. Any suitable method may be used. The wide dimension of the socket 11 is chosen to be slightly less than the distance from the outside of one finger to the other. For example, a clip commercially used was formed of metal .015 inch thick, had a long dimension of about one inch, a width of about ¼ inch, and a dimension between outside surfaces of the fingers of ⅛ inch plus two times the thickness of the metal, that is, about .155 inch. This dimension of .155 is obtained by bringing the spread apart fingers together in contact one with the other. Under these circumstances the leading or free edge 23 of the blade 19 engages the inside of the finger 18 just above the lug or stop member 22. The socket 11 is formed ⅛ inch wide, so that in order to insert the clip member 10, the two fingers 17 and 18 will have to be forced closer together by .030 inch.

In inserting the clip member 10 into the socket 11, the two reverse bent blades 19 and 20 are strained. Each is bent further downward, i. e., in a direction out of the recess. The free or leading edge 25 of the blade 20 digs into the wall 31 as shown in Fig. 4. The free edge 23 of the blade 19 moves down into engagement with the stop member 22. In both cases the outside surface of the finger is forced against a wall of the socket, the finger 17 being forced against the wall 31 and the finger 18 being forced against the wall 32 thereby preloading loop 15. This frictional engagement is very substantial, and prevents removal of the clip from the socket.

Note that pulling outward on the clip member 10, i. e., in a direction perpendicular to the surface 33 of the cover member causes the angles of both reverse bent blades 19 and 20 to tend to open. This wedges the clip even tighter, since the edge 25 digs into the wall 31, while the edge 23 is prevented from moving by the stop member 22. Pressure downward on the stop member 22 also digs the edge 25 into wall 31. Lateral movement of either side of the loop 15 is similarly resisted, since any such movement tends to decrease the angles of the reverse bent flanges or blades 19 and 20, which is most difficult if the metal is properly hardened.

Obviously the cover member 12 and/or the chassis 13 may be of metal, plastic, wood or the like.

In Fig. 5 there is illustrated a tape recording device 35 having one or more top cover members which house recording and erasing heads, for example, and which must be accurately placed and readily removable. One such cover member is shown at 36 having clips 10, intended to enter recesses 28.

It is believed that the invention has been fully explained such as to enable a complete understanding of its construction and use, and a comprehension of the important features thereof. Variations are possible within the range of equivalents of the attached claims.

What it is desired to secure by Letters Patent of the United States is:

1. A cover clip comprising a generally U-shaped integral strip member adapted for insertion in a socket to be permanently seized in said socket with the bight portion protruding from the socket, each of the arms comprising a flat finger engaged against opposite walls of the socket, each finger having a reverse bent portion on its end making an acute angle with the respective fingers, one finger being substantially longer than the other and having a free edge on the reverse bent portion engaged against the wall of the socket opposite said one finger, the reverse bent portion of the shorter finger also having a free edge, and same being engaged against the inside surface of the opposite finger.

2. A cover clip comprising a generally U-shaped integral strip member adapted for insertion in a socket to be permanently seized in said socket with the bight portion protruding from the socket, each of the arms comprising a flat finger engaged against opposite walls of the socket, each finger having a reverse bent portion on its end making an acute angle with the respective fingers, one finger being substantially longer than the other and having a free edge on the reverse bent portion engaged against the wall of the socket opposite said one finger, the reverse bent portion of the shorter finger also having a free edge, and same being engaged against the inside surface of the opposite finger, and stop means on the longer finger preventing withdrawal of said shorter finger from the socket.

3. A cover clip comprising a generally U-shaped integral strip member adapted for insertion in a socket to be permanently seized in said socket with the bight portion protruding from the socket, each of the arms comprising a flat finger engaged against opposite walls of the socket, each finger having a reverse bent portion on its end making an acute angle with the respective fingers, one finger being substantially longer than the other and having a free edge on the reverse bent portion engaged against the wall of the socket opposite said one finger, the reverse bent portion of the shorter finger also having a free edge, and same being engaged against the inside surface of the opposite finger, and stop means on the longer finger preventing withdrawal of said shorter finger from the socket, comprising a projection on the said inside surface in the path of movement of said free edge during attempts at withdrawal.

4. In combination, a normally outwardly bowed clip of flat strip U-shaped construction, a cover member having a socket therein with flat opposite walls, the clip engaged within the socket with the bight portion protruding and the arms of the U in the socket as fingers permanently holding the clip in position, each finger having a reverse bent blade formed on the free end thereof, one finger being longer than the other so that its blade engages one wall, and the shorter finger having its blade engaging the inner face of the opposite finger, the clip requiring to be pinched together to be inserted in said socket, the dimension across the clip when the blade of the shorter finger engages the opposite finger being greater than the distance between walls whereby the blades require to be further strained in order to force the clip fingers into the socket.

5. A structure as described in claim 4 in which the long finger has an inwardly protruding stop member and the blade of the shorter finger engages the same when the clip is installed in the socket.

6. A structure as described in claim 1 in which the bight is narrower than the remainder of the clip.

7. A structure as described in claim 1 in which the bight is narrower than the remainder of the clip and that portion protruding from the socket is generally rhombic in shape.

8. A structure as described in claim 4 in which the bight portion is narrow to facilitate insertion thereof into a recess, for supporting the cover member from a body having said recess.

References Cited in the file of this patent

UNITED STATES PATENTS

| | | |
|---|---|---|
| 2,142,429 | Wiley | Jan. 3, 1939 |
| 2,159,363 | Chaffer | May 23, 1939 |
| 2,504,765 | Palmenberg | Apr. 18, 1950 |
| 2,515,827 | Howard | July 18, 1950 |
| 2,596,346 | Soltysik | May 13, 1952 |